United States Patent [19]

Couceiro

[11] 4,387,676
[45] Jun. 14, 1983

[54] COLD STARTING SYSTEM FOR ALCOHOL FUELED ENGINE

[75] Inventor: Nuno P. Couceiro, Indianopolis, Brazil

[73] Assignee: General Motors Corporation, Detroit, Mich.

[21] Appl. No.: 184,047

[22] Filed: Sep. 4, 1980

[51] Int. Cl.³ .............................................. F02M 1/08
[52] U.S. Cl. ......................... 123/179 H; 123/179 G; 123/187.5 R; 123/549; 261/34 A; 261/142; 261/DIG. 74
[58] Field of Search ....... 123/179 H, 179 G, 180 AC, 123/180 R, 187.5 R, 549, 550, 551, 1 A; 261/34 A, 142, 18 R, DIG. 74, DIG. 8

[56] References Cited

U.S. PATENT DOCUMENTS

| | | | |
|---|---|---|---|
| 1,456,018 | 5/1923 | Wiegand | 123/187.5 R |
| 1,599,864 | 9/1926 | Ball | 261/34 A |
| 2,148,265 | 2/1939 | Goodman et al. | 123/187.5 R |
| 2,403,390 | 7/1946 | Moseley et al. | 261/34 |
| 3,556,065 | 1/1971 | Jordan | 123/549 |
| 3,888,223 | 6/1975 | Mondt | 123/179 G |
| 4,123,997 | 11/1978 | Oswald et al. | 123/1 A |
| 4,141,327 | 2/1979 | Marcoux et al. | 123/549 |

OTHER PUBLICATIONS

1980 Chevrolet Chevette Shop Manual, p. 6E-2.
Toyota Corolla 1976 Owner's Manual.

Primary Examiner—Craig R. Feinberg
Assistant Examiner—Andrew M. Dolinar
Attorney, Agent, or Firm—C. K. Veenstra

[57] ABSTRACT

To start an ethanol fueled engine at low temperatures, a valve directs liquid ethanol from the carburetor accelerator pump to a PTC thermistor grid disposed in the engine induction passage below the throttle. The electric grid evaporates the liquid ethanol to provide sufficient ethanol vapor to start the engine and then is deenergized when the engine has started.

2 Claims, 2 Drawing Figures

4,387,676

COLD STARTING SYSTEM FOR ALCOHOL FUELED ENGINE

TECHNICAL FIELD

This invention relates to systems for starting alcohol fueled engines at low temperatures.

BACKGROUND

Engines fueled with ethanol have proven difficult to start at temperatures less than about 15° C. because at low temperatures ethanol does not produce sufficient vapor to support combustion. The current practice in starting ethanol fueled engines at low temperatures is to discharge a quantity of gasoline into the engine induction system; a fraction of the gasoline evaporates sufficiently to start the engine, and the resulting increase in engine temperature is sufficient to thereafter sustain operation on ethanol.

SUMMARY OF THE INVENTION

This invention provides a system for starting an alcohol fueled engine at low temperatures without adding a second fuel such as gasoline.

In this system, a carburetor accelerator pump discharges liquid alcohol directly to an electric grid disposed in the engine air induction passage; the grid evaporates the liquid alcohol to provide sufficient vapor to start the engine. The grid is formed of a positive temperature coefficient thermistor material which automatically controls current through the grid to maintain the grid at a substantially constant temperature suitable for vaporizing liquid alcohol without unduly heating the air flow through the induction passage.

The details as well as other features and advantages of this invention are set forth in the remainder of the specification and are shown in the accompanying drawing.

BEST MODE FOR CARRYING OUT THE INVENTION

Figure 1:
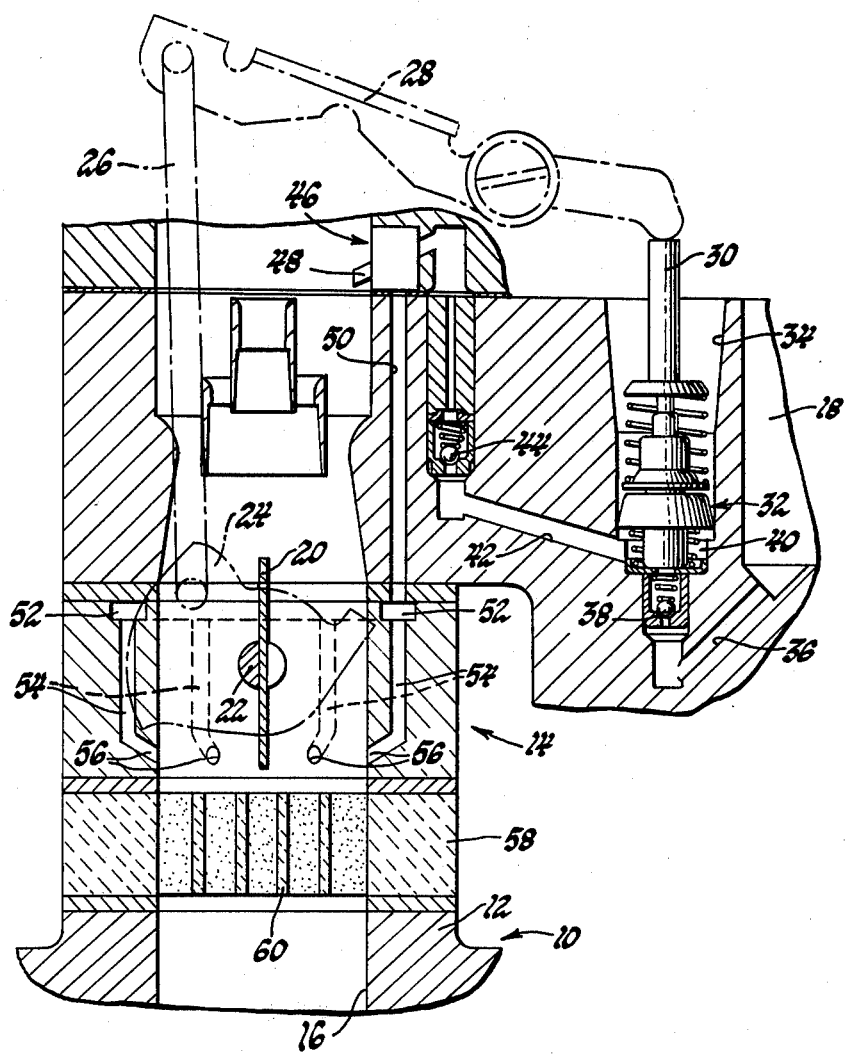
FIG. 1 is a schematic view of an engine induction system which contains a cold starting system according to this invention.

Referring to the drawing, an engine 10 has an induction system including an intake manifold 12 and a carburetor 14 which together define an induction passage 16. Carburetor 14 includes a fuel bowl 18 containing liquid ethanol which is conducted to and mixed with the air flow through induction passage 16 to provide an air-fuel mixture for combustion in the engine in a conventional manner.

A throttle 20 is disposed on a throttle shaft 22 in induction passage 16 to control flow to the engine combustion chambers. A throttle lever 24 mounted on throttle shaft 22 is connected through a link 26 and an accelerator pump lever 28 to the plunger 30 of a conventional accelerator pump assembly 32 so that, as throttle 20 is rotated to the wide open position shown, pump assembly 32 is moved downwardly in a pump well 34.

When throttle 20 is rotated counterclockwise to the closed position, pump assembly 32 moves upwardly in well 34 and liquid ethanol is drawn from fuel bowl 18, through a passage 36 and past a ball check valve 38, into a pumping chamber 40 formed in the bottom of well 34 below pump assembly 32. When throttle 20 is thereafter rotated in the opening or clockwise direction, pump assembly 32 discharges liquid ethanol from chamber 40 through a passage 42 and past a ball check valve 44 to a valve unit 46.

During normal engine operation, valve unit 46 directs the liquid ethanol from pump assembly 32 through an upper discharge nozzle 48 into induction passage 16 in a conventional manner. At low temperatures and before the engine has started, however, valve unit 46 directs the liquid ethanol from pump assembly 32 through a passage 50 to a channel 52 and from channel 52 through passages 54 to a plurality of lower discharge nozzles 56.

Lower discharge nozzles 56 spray the liquid ethanol nearly uniformly over substantially the entire area of induction passage 16, and a body 58 defines a grid 60 having a plurality of surfaces which intercept substantially all of the liquid ethanol sprayed from lower nozzles 56 before it impinges on other surfaces within induction passage 16.

Grid 60 is formed of a positive temperature coefficient (PTC) thermistor material which is connected in an electric circuit; the PTC thermistor material limits current through grid 60 to maintain grid 60 at a substantially constant temperature suitable for evaporating the liquid ethanol received from lower nozzles 56 without unduly heating the air flow through induction passage 16. Thermistor grid 60 is thus effective to evaporate the liquid ethanol directed to it by valve unit 46 and thereby provide sufficient ethanol vapor for starting engine 10.

Figure 2:
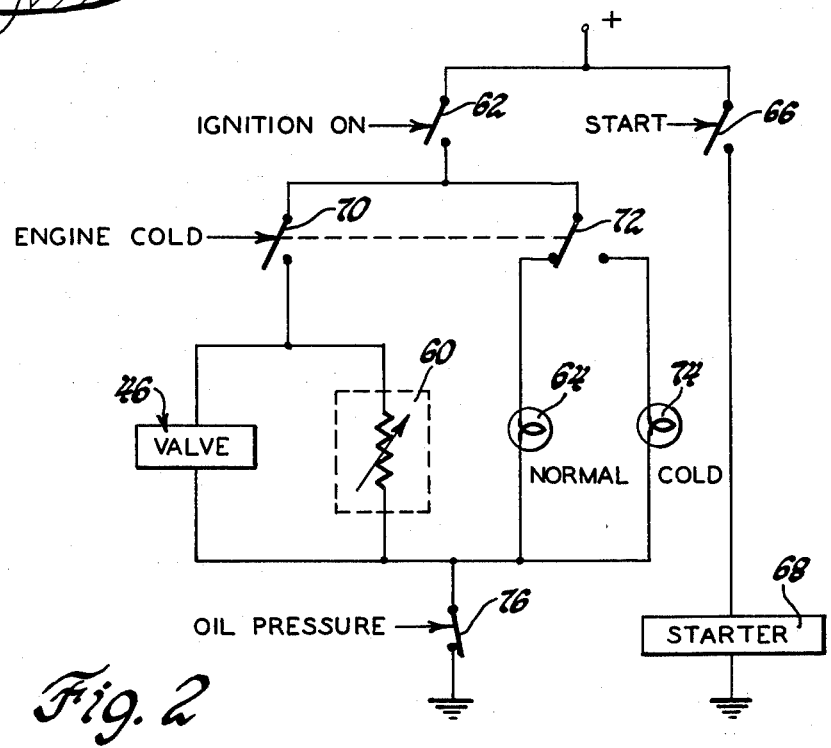
FIG. 2 schematically illustrates a control circuit which may be used with this invention.

The operation of this cold starting system may be readily understood by reference to FIG. 2. When it is desired to start engine 10, an ignition switch 62 is closed. If the engine is at a temperature suitable for starting without special provisions, a light 64 will be energized to advise the operator that the engine may be started in a normal manner, and the operator then closes a starting switch 66 to energize the starter 68. However, if the engine is at a temperature which requires special starting provisions, a switch 70 is closed to energize valve unit 46 and thermistor grid 60. Simultaneously, a switch 72 is moved rightwardly to energize a light 74 which advises the operator that special starting provisions are required. The operator then opens throttle 20 several times to discharge a measured quantity of liquid ethanol through lower nozzles 56 into thermistor grid 60 before closing switch 66 to energize starter 68. Since thermistor grid 60 heats quickly when it is energized, the liquid ethanol discharged from lower nozzles 56 is rapidly evaporated, and sufficient ethanol vapor is provided to start the engine.

Once the engine has started, the resulting increase in engine oil pressure opens a switch 76 to deenergize valve unit 46 and thermistor grid 60. Valve unit 46 then directs the liquid ethanol from pump assembly 32 through upper nozzle 48 rather than lower nozzles 56, and thermistor grid 60 cools to avoid unnecessary heating of the air flow through induction passage 16.

I have found that no more than 6–10 cc of liquid ethanol need be discharged into thermistor grid 60 to start a 2.5 liter engine at temperatures down to about −10° C. Thus if pump assembly 32 is calibrated to discharge about 2 cc of liquid ethanol on each pumping stroke, the operator need open the throttle only 3–5 times before starting the engine. Of course, greater or lesser amounts of fuel may be required for starting other engines in other circumstances.

The composition and structure of PTC thermistor grids such as grid 60 are well known and need not be described here. I have found, for example, that a thermistor grid such as that used in the 1980 model Chevrolet Chevette or that depicted in U.S. Pat. No. 4,141,327 issued Feb. 27, 1979 in the name of L. Marcoux et al is suitable for use in this system.

It will be appreciated that this invention may be employed in a variety of other embodiments within the scope of the following claims.

The embodiments of the invention in which an exclusive property or privilege is claimed are defined as follows:

1. A cold starting system for an engine having an induction passage for air flow to the engine and a throttle in said induction passage for controlling flow therethrough, said system comprising an accelerator pump connected to said throttle and having upper and lower discharge nozzles for delivering a measured amount of liquid ethanol to said induction passage as said throttle is opened, said upper nozzle delivering liquid ethanol into said induction passage upstream of said throttle and said lower nozzle delivering liquid ethanol into said induction passage downstream of said throttle, a body defining a grid having a plurality of surfaces disposed in said induction passage downstream of said throttle at a location for intercepting substantially all liquid ethanol delivered from said lower nozzle before such liquid ethanol can impinge upon other surfaces in said induction passage, said grid being connected in an electric circuit and formed of a positive temperature coefficient thermistor material which limits current through said grid to maintain said grid at a substantially constant temperature suitable for evaporating liquid ethanol without unduly heating said air flow, a valve controlling flow through said lower nozzle, and means effective at temperatures below a selected value to cause said valve to permit flow through said lower nozzle and to energize said grid to evaporate the liquid ethanol delivered through said lower nozzle, thereby providing sufficient ethanol vapor to start the engine, said means being further effective when the engine is running to cause said valve to inhibit delivery through said lower nozzle and to deenergize said grid.

2. A cold starting system for an engine having an induction passage for air flow to the engine and a throttle in said induction passage for controlling flow therethrough, said system comprising an accelerator pump connected to said throttle and having an upper discharge nozzle and a plurality of lower discharge nozzles for delivering a measured amount of liquid ethanol to said induction passage as said throttle is opened, said upper nozzle delivering liquid ethanol to said induction passage upstream of said throttle and said lower nozzles delivering liquid ethanol across substantially the entire area of said induction passage downstream of said throttle, a body defining a grid having a plurality of surfaces disposed in said induction passage downstream of said throttle at a location for intercepting substantially all liquid ethanol delivered from said lower nozzles before such liquid ethanol can impinge upon other surfaces in said induction passage, said grid being connected in an electric circuit and formed of a positive temperature coefficient thermistor material which limits current through said grid to maintain said grid at a substantially constant temperture suitable for evaporating liquid ethanol without unduly heating said air flow, a valve for alternatively directing liquid ethanol from said accelerator pump through said upper nozzle and through said lower nozzles, and means effective at engine temperatures below a selected value to cause said valve to inhibit delivery through said upper nozzle and to permit delivery through said lower nozzles and to energize said grid to evaporate the liquid ethanol delivered through said lower nozzles, thereby providing sufficient ethanol vapor to start the engine, said means being further effective when the engine is running to cause said valve to inhibit delivery through said lower nozzles and to permit delivery through said upper nozzle and to deenergize said grid.

* * * * *